United States Patent
Aggarwal et al.

(10) Patent No.: US 9,298,855 B2
(45) Date of Patent: Mar. 29, 2016

(54) OPTIMIZATION-BASED VISUAL CONTEXT MANAGEMENT

(75) Inventors: Vikram Aggarwal, Yorktown Heights, NY (US); Zhen Wen, Chappaqua, NY (US); Michelle X. Zhou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1403 days.

(21) Appl. No.: 12/137,166

(22) Filed: Jun. 11, 2008

(65) Prior Publication Data

US 2008/0306988 A1 Dec. 11, 2008

Related U.S. Application Data

(63) Continuation of application No. 11/251,686, filed on Oct. 17, 2005.

(51) Int. Cl.
G06F 3/0482 (2013.01)
G06F 17/30 (2006.01)
G06T 11/60 (2006.01)

(52) U.S. Cl.
CPC .... *G06F 17/30991* (2013.01); *G06F 17/30554* (2013.01); *G06F 17/30654* (2013.01); *G06T 11/60* (2013.01)

(58) Field of Classification Search
CPC ............................................ Y10S 707/99945
USPC .............................................. 715/783
See application file for complete search history.

(56) References Cited

U.S. PATENT DOCUMENTS

| 5,577,254 | A | * | 11/1996 | Gilbert ................ G06F 11/0709 |
| 6,058,103 | A | * | 5/2000 | Henderson et al. ............ 370/254 |
| 6,232,917 | B1 | * | 5/2001 | Baumer et al. ........... 342/357.13 |
| 6,307,573 | B1 | * | 10/2001 | Barros .......................... 715/764 |
| 6,424,933 | B1 | * | 7/2002 | Agrawala et al. ................. 703/2 |
| 6,985,929 | B1 | * | 1/2006 | Wilson et al. .................. 709/217 |
| 7,155,510 | B1 | * | 12/2006 | Kaplan .............. G06Q 30/0202 705/7.31 |
| 7,457,768 | B2 | * | 11/2008 | Horvitz .................. G06Q 30/02 705/26.62 |
| 8,620,954 | B2 | * | 12/2013 | Weissman ......... G06F 17/30442 707/713 |
| 2001/0054020 | A1 | * | 12/2001 | Barth ................ G06F 17/30867 705/37 |

(Continued)

FOREIGN PATENT DOCUMENTS

WO 2006/007275 11/2007

OTHER PUBLICATIONS

Chai et al. "Combining Semantic and Temporal Constraints for Multimodal Integration in Conversation Systems," May 2003, pp. 1-3.*

(Continued)

*Primary Examiner* — Jordany Nunez
(74) *Attorney, Agent, or Firm* — Keivan Razavi; Ryan, Mason & Lewis, LLP

(57) ABSTRACT

Improved visual context management techniques are disclosed. By way of example, a technique for updating an existing visual display to incorporate new information comprises obtaining new information requested by a subsequent user query, and dynamically deriving one or more visual transformations for updating at least a portion of the existing display to incorporate the new information, wherein the transformation derivation is modeled as an optimization operation which attempts to balance visual context management constraints and to achieve a desired presentation of intended information.

27 Claims, 11 Drawing Sheets

(56) References Cited

U.S. PATENT DOCUMENTS

| | | | |
|---|---|---|---|
| 2002/0069215 A1* | 6/2002 | Orbanes et al. | 707/500 |
| 2002/0169737 A1* | 11/2002 | Armstrong et al. | 706/59 |
| 2005/0137852 A1 | 6/2005 | Chari et al. | |
| 2006/0122993 A1* | 6/2006 | Dettinger | G06F 17/30436 |
| 2009/0006387 A1* | 1/2009 | Tunkelang | G06F 17/30424 |
| 2009/0089293 A1* | 4/2009 | Garritano | G06F 17/30713 |

OTHER PUBLICATIONS

Search Report for EP 06736569 dated Mar. 10, 2009.

K. Fishkin et al., "Enhanced Dynamic Queries via Movable Filters," ACM Conference on Human Factors in Computing Systems, May 7, 1995, pp. 415-420.

Goggle, "Explore Google Maps," http://web.archive.org/web/20051001101436/www.google.com/help/maps/tour/, Oct. 1, 2005, 4 pages.

D. Tang et al., "Polaris: A System for Query, Analysis, and Visualization of Multidimensional Relational Databases," IEEE Transactions on Visualization and Computer Graphics, Jan.-Mar. 2002, pp. 52-65, vol. 8, No. 1.

Ed H. Chi, "A Taxonomy of Visualization Techniques Using the Data State Reference Model," McGraw-Hill, Data Communications, Oct. 9, 2000, pp. 69-75. E.

M.X. Zhou et al., "A Graph-Matching Approach to Dynamic Media Allocation in Intelligent Multimedia Interfaces," Proceedings of the 10th International Conference on Intelligent User Interfaces, Jan. 9, 2005, pp. 114-121.

U.S. Appl. No. 10/969,581, filed Oct. 20, 2004, V. Aggarwal et al.

U.S. Appl. No. 11/031,951, filed Jan. 7, 2005, V. Aggarwal et al.

J. Chai et al., "Context-Based Multimodal Input Understanding in Conversation Systems," Proceedings IEEE ICMI, pp. 87-92, 2002.

M. Zhou et al., "Automated Generation of Graphic Sketches by Examples," Proceedings of IJCAI '03, pp. 65-71, 2003.

M.X. Zhou, "Visual Planning: A Practical Approach to Automated Presentation Design," Proceedings of IJCAI, 8 pages, Aug. 1999.

Bell et al., "View Management for Virtual and Augmented Reality," UIST 2001, Acm Symposium on User Interface Software and Technology, pp. 101-110, Nov. 2001.

M.M. Chun et al., "Contextual Cueing: Implicit Learning and Memory of Visual Context Guides Spatial Attention," Cognitive Psychology, vol. 36, Article No. CG980681, pp. 28-71, 1998.

K. Houck et al., "Contextual Revision in Infoilnation-Seeking Conversation Systems," Proceedings of International Conference on Spoken Language Processing (ICSLP), 4 pages, 2004.

S. Pan, "A Multi-Layer Conversation Management Approach for Information-Seeking Applications,"Proceedings of International Conference on Spoken Language Processing (ICSLP), 4 pages, 2004.

Mourad Ouzzani, "Efficient Delivery of Web Services," Dissertation, Virginia Polytechnic Institute and State University, Jan. 16, 2004, pp. 1-209.

M.X. Zhou et al., "An Optimization-Based Approach to Dynamic Data Content Selection in Intelligent Multimedia Interfaces," ACM Symposium on User Interface Software and Technology (UIST), Oct. 2004, pp. 227-236, vol. 6, Issue 2.

M.X. Zhou et al., "Automated Authoring of Coherent Multimedia Discourse in Conversation Systems," International Multimedia Conference, Sep./Oct. 2001, pp. 555-558.

* cited by examiner

OPTIMIZATION-BASED VISUAL CONTEXT MANAGEMENT

CROSS REFERENCE TO RELATED APPLICATIONS

This application is a continuation of pending U.S. application Ser. No. 11/251,686 filed on Oct. 17, 2005, the disclosure of which is incorporated herein by reference.

FIELD OF THE INVENTION

The present invention generally relates to information-seeking systems and, more particularly, to optimization-based techniques for visual context management in such information-seeking systems.

BACKGROUND OF THE INVENTION

In human-computer interactions, a computer system needs to dynamically update its visual output presentation when the user asks for a new set of data. The present invention focuses on visual context management, a process that dynamically determines how to incorporate newly requested information into an existing visual context so that users can comprehend all relevant information as a coherent whole. Here, the phrase "visual context" refers to a visual scene that a user perceives when issuing a query. Such a process is often subject to diverse constraints (e.g., ensuring semantic continuity and minimizing visual clutter) and unanticipated information introduced during a human-computer conversation. For example, the introduction of a particular visual object to convey a new piece of data may be affected by the existing visual objects for presenting related pieces of data. Without integrating new information into an existing scene, a user may have difficulty in comparing and combining information.

Since it is very difficult to predict how a human-computer conversation would unfold, it is impractical to plan all possible visual context transformations a priori. Previously, researchers and practitioners have experimented with a greedy or schema-based approach to visual context management. However, these approaches normally handle one constraint at a time and do not consider how the constraints themselves may affect one another. As a result, the visual context management result obtained from such existing approaches may not be desirable.

Accordingly, there is a need for improved visual context management techniques.

SUMMARY OF THE INVENTION

Principles of the invention provide improved visual context management techniques. Such improved visual context management techniques may be used to create improved information-seeking systems.

For example, in one illustrative aspect of the invention, a technique for updating an existing visual display to incorporate new information comprises obtaining new information requested by a subsequent user query, and dynamically deriving one or more visual transformations for updating at least a portion of the existing display to incorporate the new information, wherein the transformation derivation is modeled as an optimization operation which attempts to balance visual context management constraints and to achieve a desired presentation of intended information.

The step of dynamically deriving visual transformations to incorporate new information into the existing display may further comprise modeling the visual context management constraints as feature-based desirability metrics. The feature-based metrics may measure one or more of a display overlap value, a perceptual landmark preservation value, a transition smoothness value, a visual ordering value, a visual clutter value. The feature-based metrics may be formulated using user information, e.g., a data navigation preference of the user.

Further, the step of dynamically deriving visual transformations to incorporate new information into the existing display may further comprise performing the optimization operation such that the desirability metrics are maximized for one or more visual transformation operators.

Still further, the optimization operation may comprise a global optimization technique, e.g., a simulated-annealing technique.

Advantageously, to incrementally present diverse, unanticipated information introduced during a human-computer conversation, principles of the invention model visual context management as an optimization problem. One main objective is to find a set of optimal visual transformations that maximize the satisfaction of all relevant constraints (e.g., ensuring semantic continuity and minimizing visual clutter). As a result, principles of the invention are capable of deriving a set of near optimal visual transformations by simultaneously balancing a comprehensive set of constraints. Such techniques are easily extensible, since they preferably use feature-based metrics to uniformly model all visual context management constraints.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that while the present invention will be described below in the context of exemplary information-seeking applications such as a real-estate application and a hospitality application, the invention is not so limited. Rather, the invention is more generally applicable to any application in which it would be desirable to provide optimization-based visual context management techniques and services. Further, the invention is more generally applicable to any application in which it would be desirable to provide quality presentations of information or such presentation service.

As used in the following context, we first define the following terms. We use the term "data objects" to broadly refer to any type of data content that is intended to be presented (e.g., a list of house listings residing in a real-estate database or a list of hotels existing on a website). We use the term "media objects" broadly to refer to any type of media that is available to be used to present the data content, such as but not limited to speech, text, and graphics. We also use the term "context" to refer to the situation where the presentation of the intended data content is given. This may include information, such as but not limited to, the tasks that users are performing, the conversation context that has been established during the human-computer interaction, the user model including user preferences and interests, and the environment model including device properties.

As will be explained in illustrative detail below, principles of the present invention provides a framework, system, and methods for dynamically updating an existing visual display associated with an information-seeking system to effectively incorporate new information requested by subsequent user queries. Such techniques dynamically derive one or more visual transformations for updating at least a portion of the existing display to incorporate new information, wherein visual context management is modeled as an optimization operation which attempts to balance diverse visual context management constraints and to achieve a desired presentation of intended information.

Figure 1:
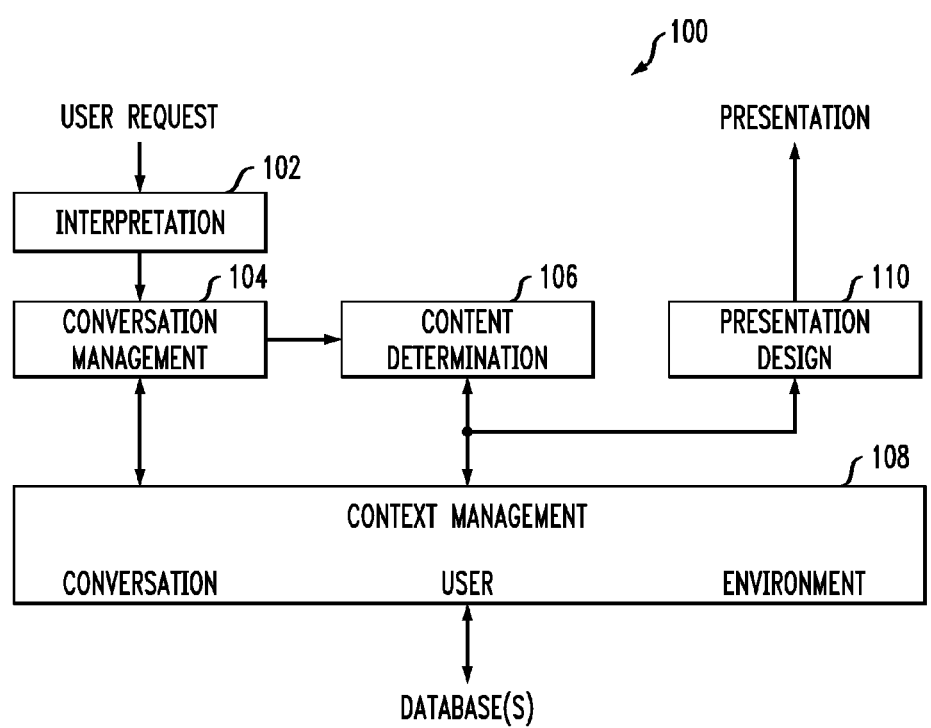
FIG. 1 is a diagram illustrating an intelligent, context-sensitive information-seeking system employing a visual context management component, according to one embodiment of the present invention.

Referring initially to FIG. 1, a diagram illustrates an intelligent, context-sensitive information-seeking system employing a visual context management component, according to one embodiment of the present invention. It is to be appreciated that such a system may also be referred to as a "conversation system" since a sequence of one or more queries and one or more responses between a user and the system may generally be referred to as a conversation.

As shown, information-seeking system 100 comprises interpretation module 102, conversation management module 104, content determination module 106, context management module 108 and presentation design module 110.

While the invention is not limited thereto, in one embodiment, techniques described in K. Houck, "Contextual Revision in Information-Seeking Conversation Systems," ICSLP 2004, and/or in J. Chai et al., "Context-based Multimodal Input Understanding in Conversation Systems," the disclosures of which are incorporated by reference herein, may be used by interpretation module 102.

Further, in one embodiment, techniques described in S. Pan, "A Multi-layer Conversation Management Approach for Information-Seeking Applications," ISCLP 2004, the disclosure of which is incorporated by reference herein, may be used by conversation management module 104.

Still further, in one embodiment, techniques described in U.S. patent application Ser. No. 10/969,581, filed Oct. 20, 2004 and entitled "Optimization-Based Data Content Determination," the disclosure of which is incorporated by reference herein, may be used by content determination module 106.

Also, in one embodiment, techniques described in the above-referenced J. Chai et al., "Context-based Multimodal Input Understanding in Conversation Systems" article may be used by context management module 108.

It is to be understood that the above references cited for techniques that may be employed by the various components are merely examples of techniques that such components may employ. That is, such components are not limited to implementing such example techniques.

However, it is to be appreciated that the visual context management techniques of the invention are preferably implemented in presentation design module 110.

The input to system 100 is a user request, given in one or more forms (e.g., through a graphical user interface or by speech and gesture). Given such a request, interpretation module 102 is employed to understand the meaning of the request. Based on the interpretation result, conversation management module 104 decides the suitable system actions at a high level. Depending on the context, it may decide to honor the user request directly by presenting the requested data or it may choose to ask the user additional questions. Since a high-level system act does not describe the exact content to be presented, it is then sent to content determination module 106 to be refined.

Content determination module 106 decides the proper data content of a response based on the interaction context (e.g., how much data is retrieved based on the current user query and the available presentation resource such as time and space). Context management module 108 manages and provides needed contextual information for making various decisions (e.g., the user interests and preferences). While not limited thereto, there are three common types of contexts: conversation context; user context; and the environment context. Such information may be stored in one or more databases. The conversation information records the sequences of user requests and the computer responses. The user information includes user preferences and interests. The environment information includes the information about the system environment, e.g., what type of display is used.

After the data content is determined, a media allocation component (not expressly shown but which may, for example, be the one described in U.S. patent application Ser. No. 11/031,951, filed Jan. 7, 2005 and entitled "Optimization-Based Media Allocation," the disclosure of which is incorporated by reference herein) may be used to allocate different media to convey the intended data in the form of one or more data-media mappings.

Such results are then sent to presentation design module 110 to be presented. As mentioned above, the visual context management techniques of the invention are preferably implemented in presentation design module 110.

The information-seeking system 100 supports context-sensitive information access and exploration through use of intelligent multimodal conversation. Specifically, the system allows users to express their information requests in context using multiple modalities, including natural language, graphical user interface (GUI), and gesture. Moreover, the system dynamically creates a tailored response, including visual and spoken outputs, e.g., see FIGS. 2A-C. While the information-seeking system may be implemented in any variety of applications, two illustrative applications are used herein to describe features of the system, namely, a real-estate application that helps users to search for residential properties and a hospitality application that aids users in finding hotels and relevant amenities (e.g., restaurants).

Based on the understanding of a user request, the information-seeking system automatically creates its response in three steps. First, the system decides the type of a response. In the case of user query U1 in FIG. 2A, the system decides to present the requested houses directly. Depending on the context, the system may formulate different types of responses. For example, it may ask the user to supply additional constraints if the retrieved data set is very large. Second, the system determines the content of the response. In responding to U1, the system selects a subset of house attributes such as the price and style. Third, the system designs the form of the response using suitable media and presentation techniques. For example, in system response R1 in FIG. 2A, the system uses graphics to display house data on a map and speech to summarize the number of retrieved houses.

Figure 2A:
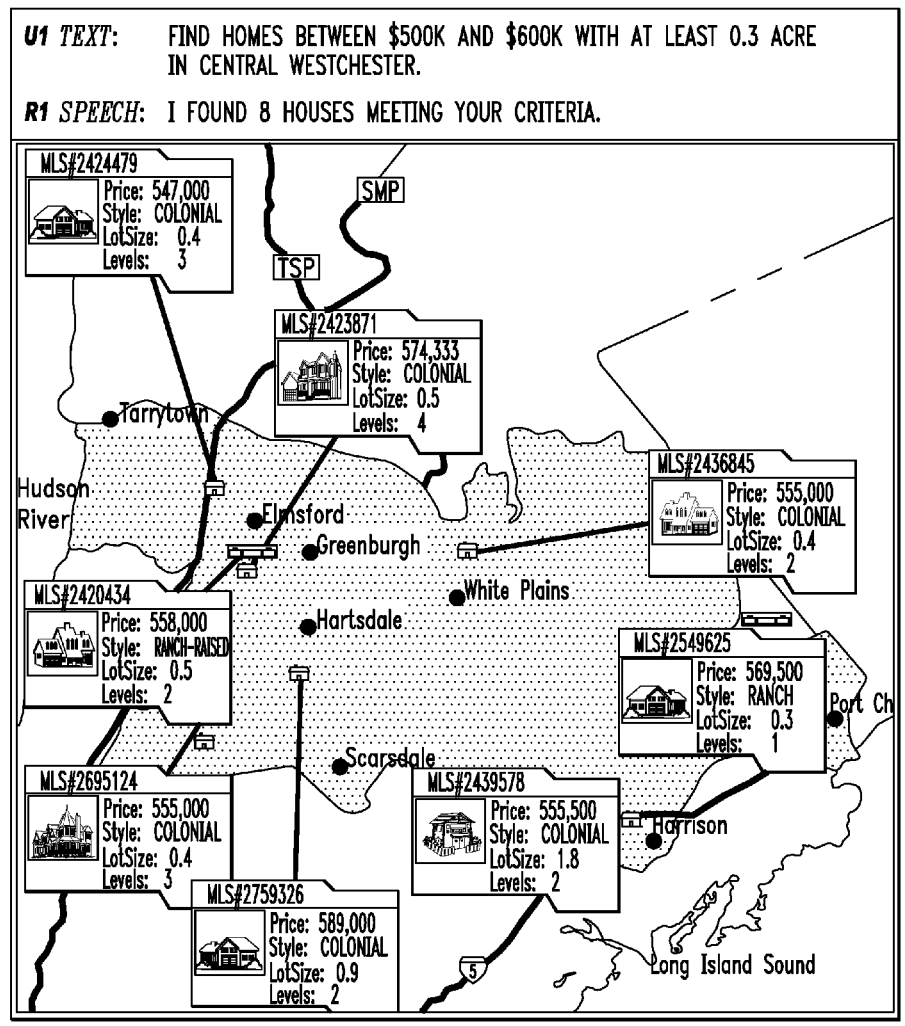
FIGS. 2A-C are diagrams illustrating a first recorded user-system conversation fragment, according to one embodiment of the present invention.
Figure 2B:
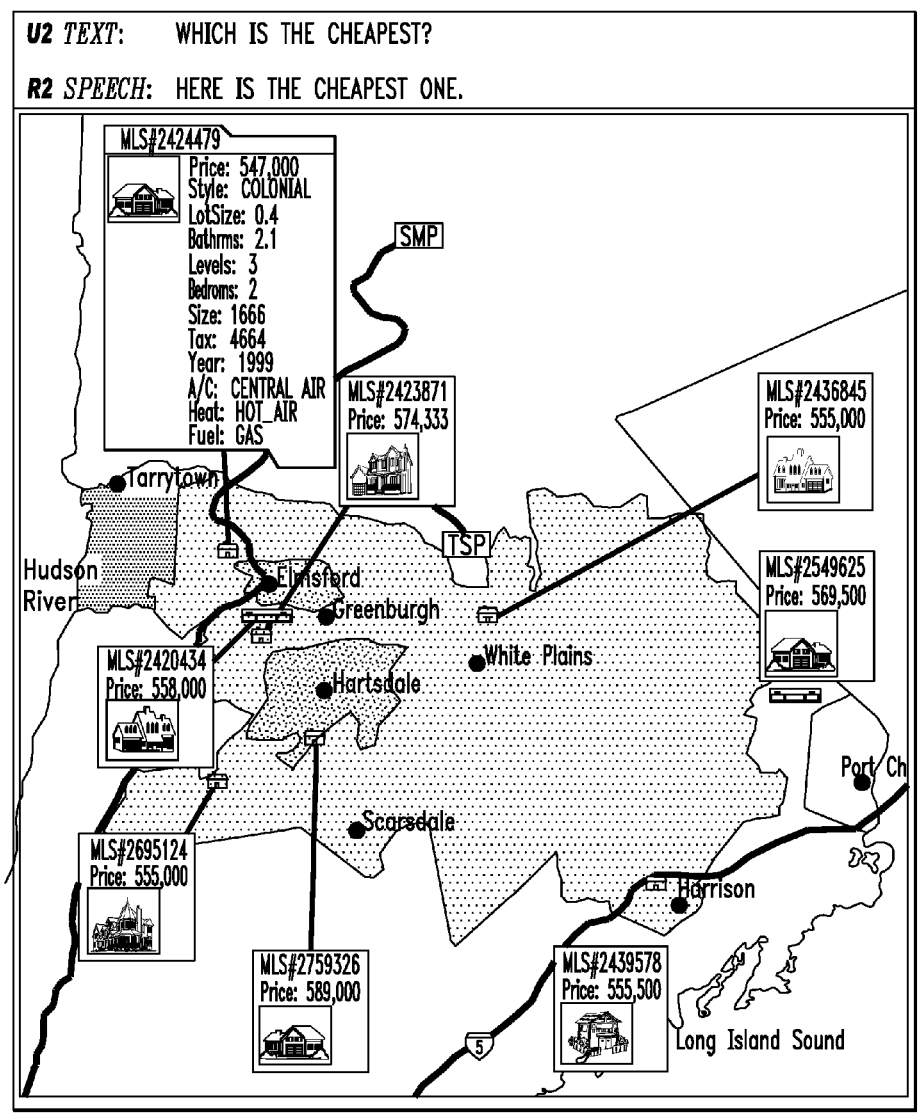
Figure 2C:
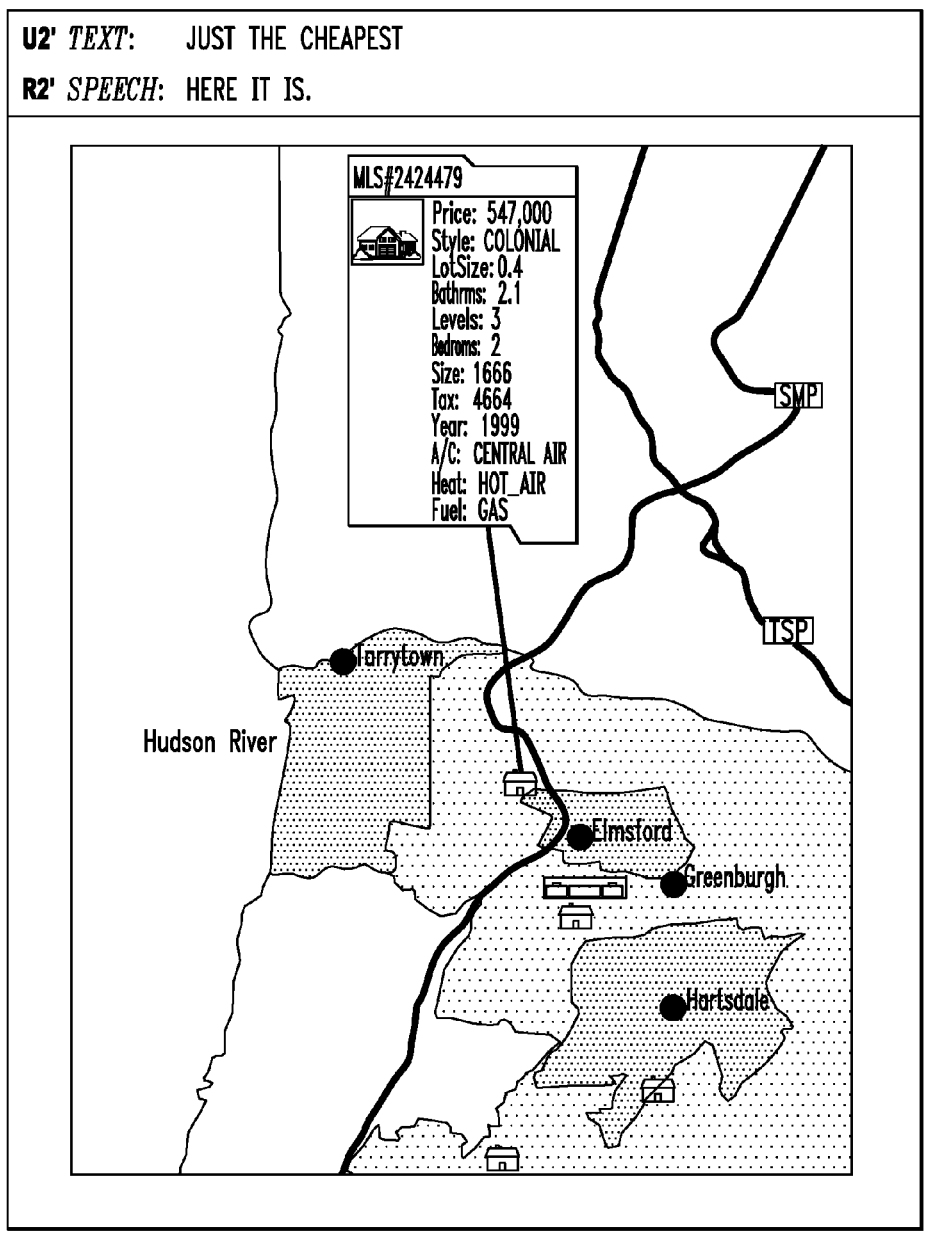

To handle a follow-up request such as user query U2(FIG. 2B), the information-seeking system creates a response R2 that emphasizes the cheapest house while preserving most of the existing visual context of R1 (FIG. 2A). In contrast, for request U2' (FIG. 2C), the system zooms in on the requested house and keeps others to their minimum (response R2' (FIG. 2C)). Here we use the term visual context to refer to a visual scene that a user perceives when issuing a query. Without integrating new information into an existing scene, a user may have difficulty in comparing and combining information. For example, if response R2 (FIG. 2B) displays only the cheapest house, the user may not easily relate this house to others retrieved earlier.

As demonstrated by this example, the information-seeking system tailors its response to a user request at run time. Principles of the invention focus on visual context management, a process that dynamically determines how to incorporate newly requested information into an existing visual context so that users can comprehend all relevant information as a coherent whole. More precisely, visual context management is used to derive a set of visual transformations, which updates the existing context to incorporate the new information. For example, to obtain response R2 in FIG. 2B, the system updates R1(FIG. 2A) by adding details to the cheapest house and simplifying other retrieved houses.

Figure 3:
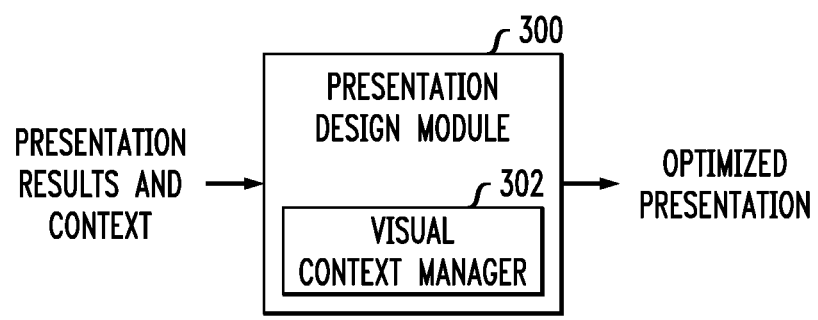
FIG. 3 is a diagram illustrating a visual context management framework, according to one embodiment of the present invention.

Referring now to FIG. 3, a diagram illustrates a presentation design module (e.g., module 110 in FIG. 1), according to one embodiment of the present invention. More particularly, FIG. 3 depicts an example embodiment of an optimization-based visual context management framework. That is, the visual context management techniques, implemented by the presentation design module, dynamically determine how to incorporate newly requested information into an existing visual context so that users can comprehend all relevant information as a coherent whole.

The input to framework 300 includes existing context (as will be explained in more detail below) and presentation results in the form of one or more data objects to be conveyed and a set of one or more available media objects. For example, the data objects may be a set of houses requested by a user to be presented, and the media objects may include available media to be used such as speech, text, and graphics. In accordance with visual context manager 302, an optimized presentation is generated. Illustrative details of how such an optimized presentation may be generated will now be explained.

Figure 4:
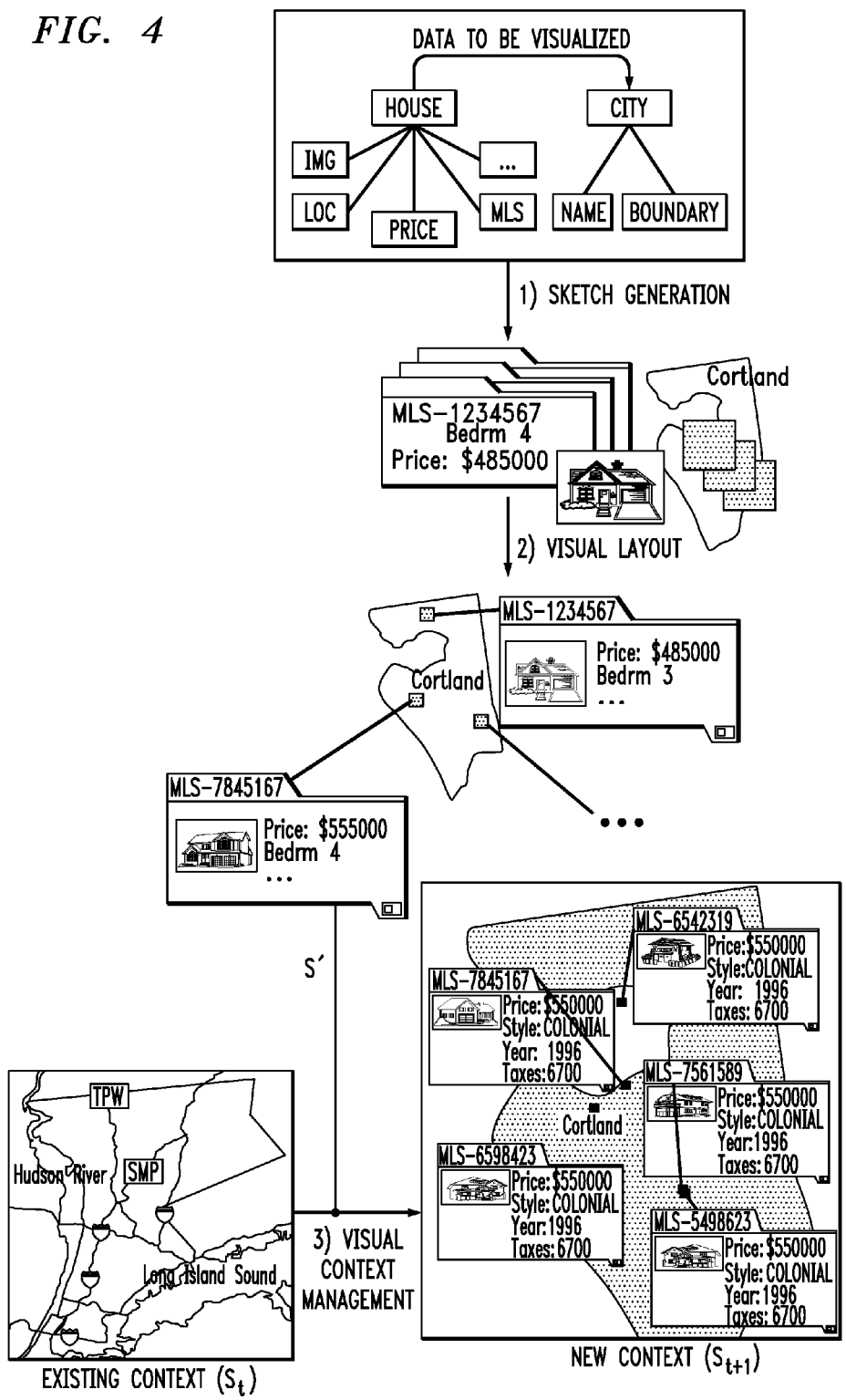
FIG. 4 is a diagram illustrating a visual output generation methodology, according to one embodiment of the present invention.

FIG. 4 provides an overview of operations of presentation design module 300 (FIG. 3), also referred to herein as a visual designer. The visual designer automatically creates a visualization to address a given user query. In an illustrative embodiment, it is a three-step process. First, a sketch generator creates a visual sketch, which uses a set of visual objects to encode the data to be visualized. A conventional sketch generation technique may be used, by way of example only, the techniques described in M. Zhou and M. Chen, "Automated Generation of Graphic Sketches by Examples," IJCAI '03, pp. 65-71, 2003, the disclosure of which is incorporated by reference herein.

Second, a visual layout manager determines the size and location of the visual objects in the sketch. Specifically, the process automatically derives a set of spatial layout constraints, such as ensuring visual balance and avoiding object occlusion. In one embodiment, the process may use a non-linear constraint solver to solve geometric constraints (e.g., proportional and layering constraints), and a space manager to position floating objects (e.g., callouts and textual labels).

Third, a context manager updates the existing visual context to incorporate the sketch.

Although the process may be implemented as a three-step pipeline, these three steps may be inter-twined. For example, since the layout manager knows little about what the context manager would do, it may need to relocate the objects after the context manager decide what to keep/delete. To avoid going back and forth between the two steps, the layout manager may compute a range of candidate size and location parameters for each visual object in the scene.

We use a set of examples to illustrate how visual context management is subject to a number of factors, such as user preferences and various visualization constraints. First, a user's data navigation preference, which is often implied by a user query expression, impacts visual context management. For example, query U2 in FIG. 2B may imply that the user is browsing the data, while query U2' (FIG. 2C) may suggest that the user is filtering the data. The system may use language cues, such as words "just" or "which one," to infer the user intention. Accordingly, for query U2 (FIG. 2B), the system preserves most of the visual context to facilitate further data browsing (response R2 (FIG. 2B)), while zooming in on the cheapest house for query U2'(FIG. 2C) to satisfy data filtering (response R2' (FIG. 2C)).

Figure 5:
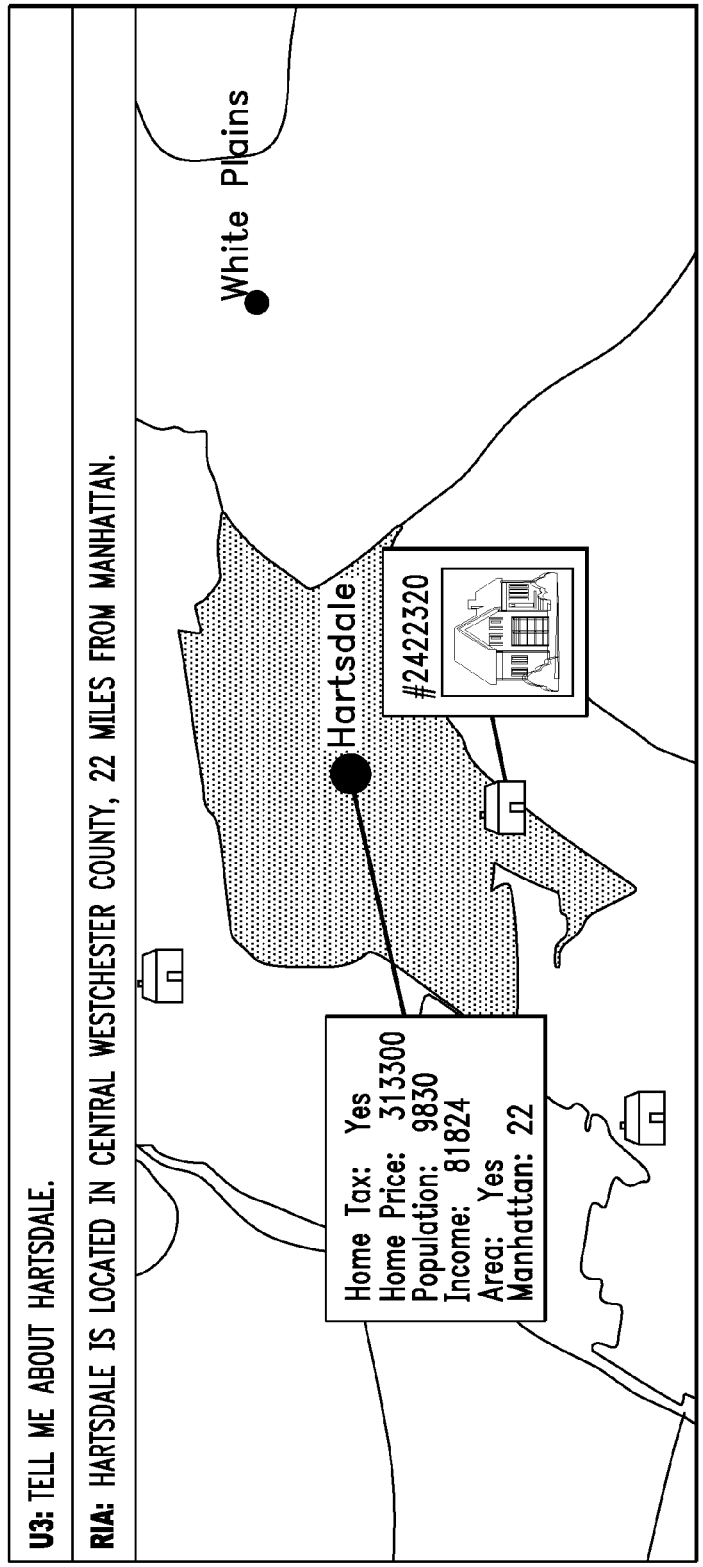
FIG. 5 is a diagram illustrating a second recorded user-system conversation fragment, according to one embodiment of the present invention.
Figure 6:
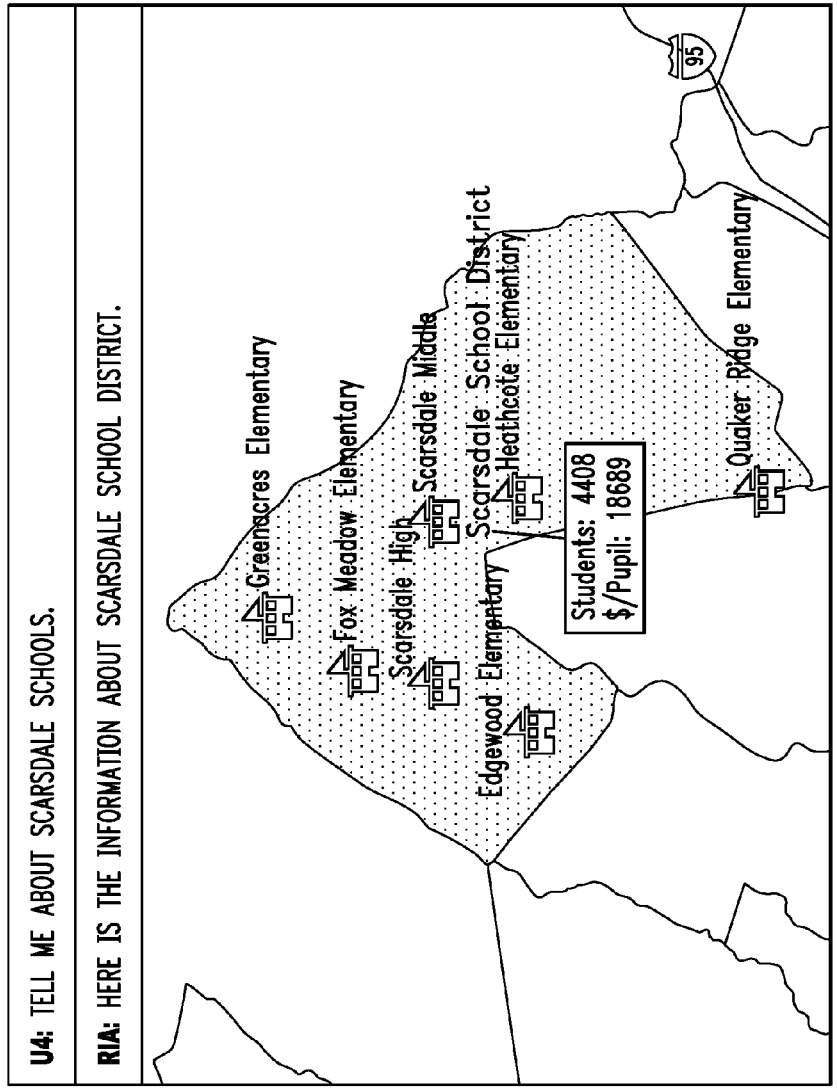
FIG. 6 is a diagram illustrating a third recorded user-system conversation fragment, according to one embodiment of the present invention.

Moreover, a user's conversation preference affects visual context management. By default, the system assumes that a user conducts a continuous conversation and interprets a user query in the context of previous queries. Suppose that query U3 in FIG. 5 is issued after query U1 in FIG. 2A. As a continuation, the system presents the requested city data while preserving the relevant houses shown in response R1 (FIG. 2A). During a conversation, however a user may want to start a new context. The system may permit a user to click on a "new context" button to indicate his context switching preference. Instead of issuing query U3 after query U1, the user issues query U4 in FIG. 6 to switch to a new context. In this case, the system creates a new visual output that only shows the requested school data.

Figure 7:
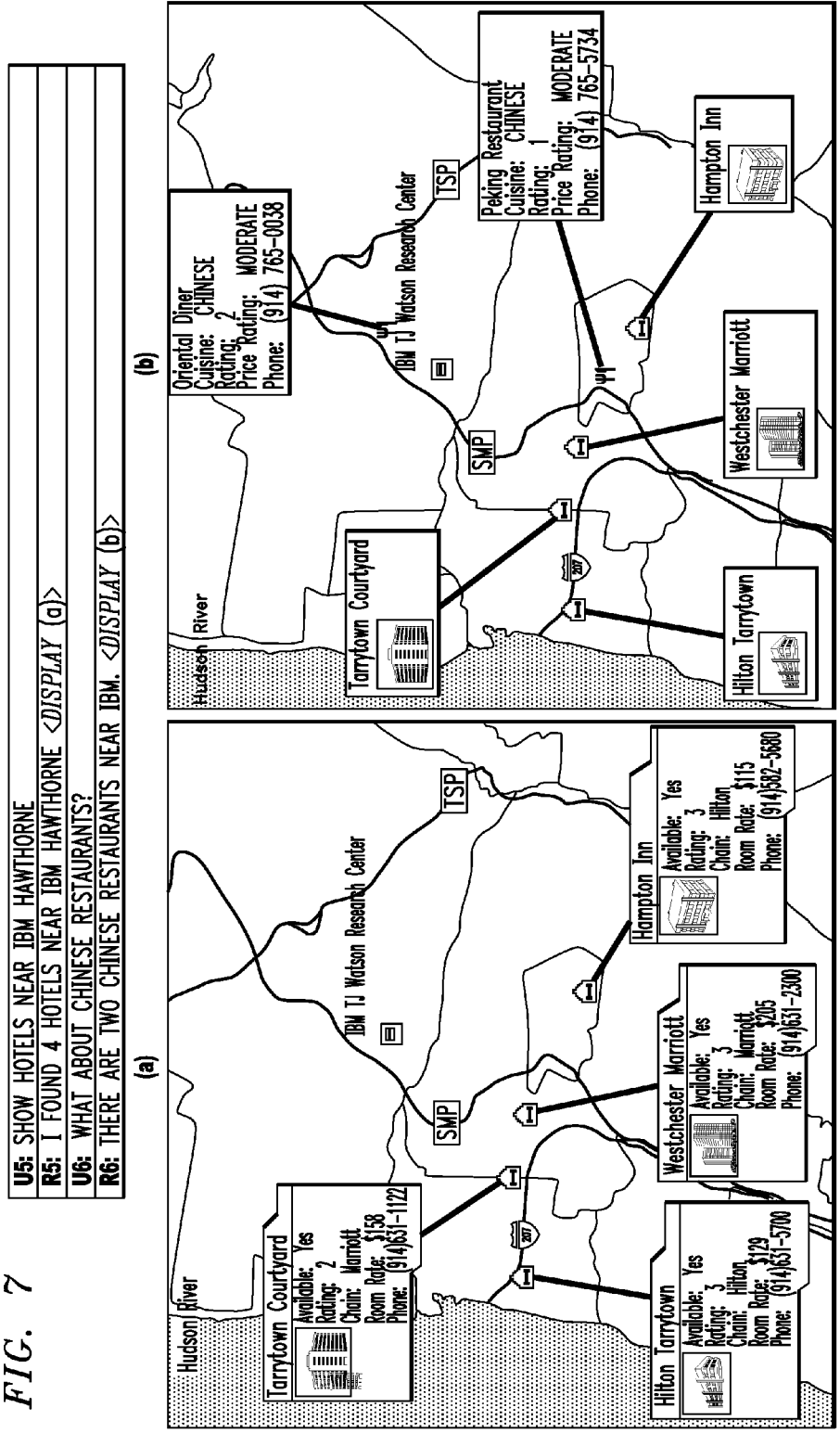
FIG. 7 is a diagram illustrating a fourth recorded user-system conversation fragment, according to one embodiment of the present invention.

In addition to user preferences, various visualization constraints, such as maintaining continuity across displays and minimizing visual clutter, influence visual context management. To maintain semantic continuity, for example, for query U3 in FIG. 5, the system incorporates the requested city data in the context of relevant houses. Moreover, to maintain visual continuity, in FIG. 7, the system displays the requested restaurants along with the hotels retrieved earlier, although the restaurants and the hotels are remotely related according to our data ontology.

Over the course of a user-system conversation, visual objects may be accumulated in a visual context. Since complex visual displays may overload a user's working memory and impair information comprehension, the system tries to minimize visual clutter while maintaining continuity. To reduce clutter, the system can simplify less important information like the houses in FIG. 5 and hotels in FIG. 7, or simply remove irrelevant data.

To help users to integrate information across multiple scenes, the system also maintains important perceptual landmarks and provides smooth transitions. For example, in FIGS. 2A-C, the system preserves the geographical landmarks, such as the Hudson River and major highways, which helps to anchor the visual transition. Moreover, the system ensures smooth visual transitions to allow users to keep track of the changes. For example, the system may animate camera changes and visual object updates.

Accordingly, the system considers a wide variety of visual context management constraints, including accommodating user preferences, ensuring visual continuity, and minimizing visual clutter. These constraints often exhibit inter-dependencies and may even conflict with one another. For example, preserving semantic continuity may violate a visual clutter reduction constraint. It thus would be very difficult to maintain a coherent visual context using simple heuristics, which may not be able to balance all constraints.

To balance all relevant constraints simultaneously, principles of the invention provide an optimization-based approach to visual context management. Illustrative details of this approach (e.g., implemented by presentation design module 110 of information-seeking system 100 of FIG. 1) will now be given in the subsections below.

We illustratively explain the process in three steps. First, we present our feature-based representation that characterizes a visual context and visual operators (subsection A). Here a visual operator defines a visual transformation that updates the properties of one or more visual objects. For example, a highlight operator updates the appearance of visual objects. Second, we use the defined features to formulate a set of metrics that uniformly models various visual context management constraints (subsection B). In particular, each metric assesses the desirability of applying one or more visual operators to update a visual context. Third, we present a simulated-annealing algorithm that dynamically derives a set of visual operators by maximizing the satisfaction of all relevant constraints (subsection C).

(A) Feature-Based Representation

A visual context is continuously updated during a user-system conversation. To model such a dynamic visual context, we describe the state of the context at the beginning or end of each user turn. Formally, we use the following notations. Given user turn t+1, $S_t$ denotes the visual context at the beginning of the turn, and $S_{t+1}$ is the visual context at the end of the turn. We use a set of features to describe semantic and syntactic properties of $S_t$ and $S_{t+1}$. Similarly, we use a set of features to characterize each visual operator.

(A)(i) Bi-Level Visual Context Representation

Visual context $S_t$ consists of a set of visual objects. For example, at the beginning of user turn U2 (FIG. 2B), the visual context contains objects such as retrieved houses and cities (R1 of FIG. 2A). To characterize the overall scene at $S_t$ and each visual object involved, we develop a bi-level descriptor, which describes the overall properties of a scene and the details of each visual object.

Figure 8:
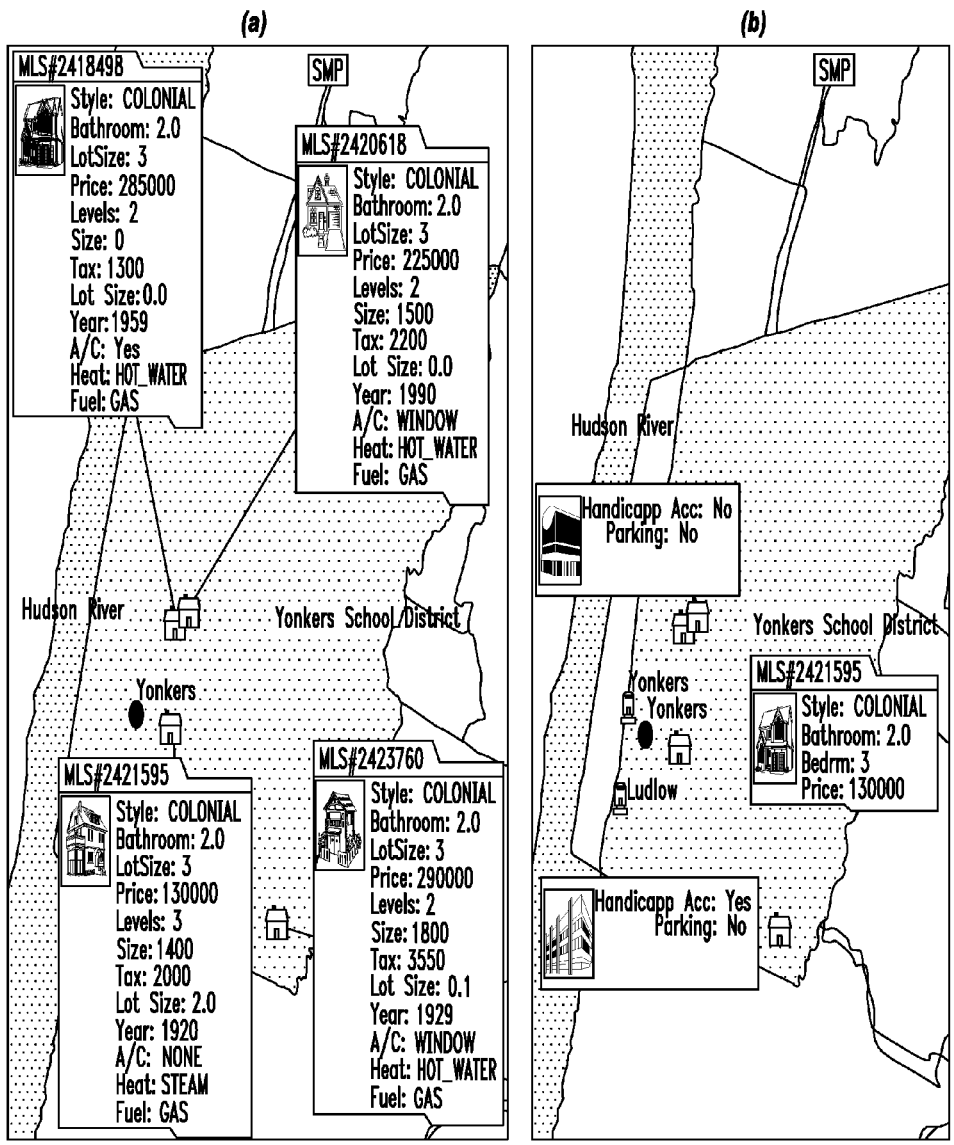
FIG. 8 is a diagram illustrating a fifth recorded user-system conversation fragment, according to one embodiment of the present invention.

Specifically, we describe a scene using aggregated features, such as the total number of visual objects (volume) and the number of colors used (colorVariety) in the scene. As our goal is to incorporate a new scene into an existing visual context, we use the same set of features to describe the new scene (e.g., the details of the cheapest house in U2 in FIG. 2B). To facilitate the integration, we add two features: foci and scope. Feature foci describes the current query focus, while scope includes all information to appear in the new scene. For query U8 in FIG. 8, foci are the requested train stations, while scope includes both the train stations and the house constraining the train stations. Given a user query, the system now dynamically decides both foci and scope, which are used to set the camera parameters and assess the semantic relevance between the new scene and the existing visual context.

Besides describing an overall scene, we characterize the properties of each visual object. A visual object is an encoding of a data object and has basic visual properties, such as color, size, and location. To facilitate visual context management, here we focus on the data and visual semantic features. We use data features such as category to describe the semantic category of the encoded data, and visual features such as prominence to specify how a visual encoding may be perceived. Table 1 below lists semantic features that the system uses. Among these features, we focus on explaining three complex ones: data importance (dImportance), visual importance (vImportance), and visual prominence (prominence).

TABLE 1

Features for a visual context (*dynamically computed)

| Feature | Definition |
| --- | --- |
| Visual object-level features | |
| Category | semantic category of data defined in a data ontology |
| Landmark | whether an object is a landmark specified by ontology |
| shapeComplexity | how complex a shape it is-a pre-assigned score |
| dImportance* | how semantically important it is to the current context |
| vImportance* | how visually important it is to the current context |
| prominence* | how visually prominent it appears |
| Visual scene-level features | |
| Volume* | number of visual objects in a scene |
| colorVariety* | number of different colors in a scene |
| Shape Variety* | number of different geometric shapes in a scene |

Data importance. Feature "data importance" indicates how important a data object is to a given user turn. All data objects start with the same importance value (0.0). The system dynamically updates the data importance in two ways. First, the system uses its content selector to decide the data importance. If the content selector chooses a data object to present at a given user turn, it updates the importance of this object accordingly. For query U8 in FIG. 8, the content selector selects the requested train station data with the highest importance and the house constraining the train stations with a lower importance. If a data object is not selected, its importance is then reduced using a time decay function. For example, to respond to U2 in FIG. 2B, the system does not select the houses shown earlier, except the cheapest one. Accordingly, their importance values are reduced at turn U2. In a special case where a user starts a new context, the system resets the importance to 0.0 for non-selected data.

Second, the system uses the data relationships to decide data importance. This is very useful when the content selector assigns the same importance to multiple data objects. In response R1 (FIG. 2A), the content selector assigns the same importance to all retrieved houses. Since these houses are not mentioned in U3 (FIG. 5), their importance is reduced. However houses located in Hartsdale are more semantically relevant to U3 than others are. As a result, the system better preserves these houses to provide the user a useful context to comprehend the retrieved city data (FIG. 5). Thus, we define a semantic relevance metric:

$$R_s(d,D')=\text{Max}[R_s(d,d'_j),\forall j],$$

where d is a data object, and D' is the current query foci, $d'_j \in D'$, and $R_s(d,d'_j)$ computes the relevance between two data objects:

$$R_s(d, d'_j) = \begin{cases} 1, \text{ if two data objects are the same} \\ \beta(r(d, d'_j)), \text{ otherwise} \end{cases} \quad (a)$$

Here β is a function indicating the relevance value of the relation r between d and $d'_j$ in a database. The system uses a data ontology to look up the data relation r between d and $d'_j$. It then uses the database to verify the relation. Let d be a house and $d'_j$ be a city in a database. By our ontology, a house is located-in a city. Using this relation, the system verifies whether house d is in fact located in city $d'_j$ in the database. If the relation holds, then β=1, otherwise β=0. Now, we statically define the value of r( ) for each type of data relation in an ontology.

In summary, we define data importance for data object d at a given user turn t+1 as follows:

$$I_d(d, t+1) = \begin{cases} val, \text{ if } d \text{ is selected at turn } t+1 \\ 0.0, \text{ if new context starts, otherwise} \\ \text{Max}[I_d(d, t) \times \exp(-\alpha), R_s(d, D')] \end{cases} \quad (1)$$

Here val is the data importance computed by the content selector and α is the decay factor, now α=1.5 for a rapid decay.

Visual importance. While data importance assesses how a visual object is related to a user query semantically, visual importance measures how the visual object is related to the current query foci spatially. In general, when presenting user-requested information, it is desirable to show items that are located nearby, since such items help to establish a useful context for a user to comprehend the intended information. For example, in FIG. 7(b), the system shows the requested restaurants and the nearby hotels to give the user an overall sense of where everything is.

By this notion, feature visual importance is the spatial relevance of a visual object v to the visual representation of the current query foci V':

$$I_v(v)=1-\text{Min}[\text{dist}((v,v'_j),\forall j], \quad (2)$$

where $v'_j \in V'$, dist( ) computes the Euclidean distance of two visual objects in a normalized screen coordinate.

Visual prominence. Visual prominence measures how easily a visual object can be perceived by a user. It is modeled using three basic visual variables: color, size, and location. Given a visual object v, we define its color prominence $P_1(v)$, size prominence $P_2(v)$, and location prominence $P_3(v)$.

Color prominence states that the more contrast a visual object produces against a background, the more prominent it can be perceived. For example, a red object is more prominent than a yellow object against a white background. Function contrast( ) returns the contrast value between two colors:

$$P_1(v)=\text{contrast}(v \cdot \text{color}, \text{background}).$$

Size prominence asserts that the bigger a visual object is, the more prominent it appears:

$$P_2(v)=v \cdot bbx \cdot \text{width} \times v \cdot bbx \cdot \text{height},$$

where the bounding box is computed in a normalized screen coordinate.

Location prominence states that objects placed near the center of a display are more prominent than those located elsewhere:

$$P_3(v)=1-\text{dist}(v, c),$$ where c denotes the center of a display, function dist( ) computes the normalized screen Euclidian distance between v and the center.

Combining three formulas above, we model the overall visual prominence of visual object v:

$$P(v) = \sum_i u_i \times P_i(v), \quad (3)$$

where $i = 1 \ldots 3$, and weight $u_i = 0.33$.

(A)(ii) Visual Operator Representation

We use a set of visual operators to model visual transformations that update a visual context and incorporate new information. Visual operators can be categorized based on their effects. We have identified four groups of operators: camera operators that modify the parameters of a camera, appearance operators that update visual appearance (e.g., Highlight), geometry operators that change geometric properties (e.g., Move and Scale), and structural operators that modify a scene structure (e.g., Add). Table 2 below lists operators that the system uses. Depending on the actual implementation, an operator may exhibit different visual effects. For example, we may implement Delete by making objects transparent or simply hiding them.

TABLE 2

A catalog of visual operators

| Operator | Definition |
| --- | --- |
| Camera Operators | |
| Camera | Update camera parameters (e.g., zoom in) |
| Appearance Operators | |
| Highlight | Highlight an existing visual object (e.g., change color) |
| Geometry Operators | |
| Move | Modify the location of a visual object |
| Scale | Modify the size of a visual object |
| Structural Operators | |
| Simplify | Simplify the representation of a visual object |
| Add | Add a visual object to a scene |
| Delete | Delete a visual object from a scene |

To represent all visual operators uniformly, we associate each operator with seven features. Feature operand denotes visual objects that an operator manipulates, and feature parameter holds the specific information that is required to perform the intended transformation. As shown below, operator Scale has one parameter scaleFactor. Feature effect is a function measuring what properties of the operands are to be modified after the operation. For example, Scale changes the size of an object. On the other hand, feature cost estimates the cost of performing the intended visual transformation. Cost measures the perceptual cost needed for a user to perceive the transformation. For example, it is more costly for a user to perceive object movements than highlighting effects. Finally, features temporal-priority, startTime and endTime control the timing of applying an operator. The fragment below outlines the definition of operator Scale:

```
Scale extends Operator {
    List operand
    Vector3 scaleFactor // parameter stating how much to scale
    float effect( ) // this function modifies the size of operands
    float cost = medium
    float temporal-priority = medium
    float startTime, endTime
}
```

(B) Feature-Based Desirability Metrics

As above, a number of constraints influence visual context management, including user preferences and visualization constraints. To uniformly model all constraints, we define a set of metrics based on our representation of a visual context and visual operators. These metrics assess the desirability of applying one or more visual operators to an existing visual context to incorporate new information. By their purpose, we divide the metrics into two groups: visual momentum metrics and visual structuring metrics. Visual momentum metrics assess the coherence of a visual context across displays. Visual structuring metrics evaluate the structural coherence of a visual context after the new information is integrated. Our purpose here is not to enumerate a complete set of visual context management constraints, instead we show how to formulate key constraints quantitatively. For simplicity, all feature/metric values are normalized to lie between [0, 1].

(B)(i) Visual Momentum Metrics

Visual momentum measures a user's ability to extract and integrate information across multiple displays. Since the amount of visual momentum is proportional to a user's ability of comprehending information across displays, the system tries to maximize the visual momentum when updating a visual context. Specifically, we employ three techniques that are applicable to our visual context management task: 1), maximizing both semantic and visual overlaps of consecutive displays, 2) preserving perceptual landmarks, and 3), ensuring smooth visual transitions.

Maximizing display overlap. Proper display overlap helps users to incrementally piece together information across successive displays. We define two metrics: visual overlap and semantic overlap metrics. A visual overlap metric computes the invariance between two displays, specifically the average invariance of each visual object in $S_t$ and its new state in $S_{t+1}$:

$$O_v(S_t, S_{t+1}) = \frac{1}{N^2} \sum_i inv(v_{i,t}, v_{i,t+1}).$$

Here visual object $v_{i,t} \in S_t, v_{i,t+1} \in S_{t+1}$, and $v_{i,t+1} = op(v_{i,t})$, $op_i$ is a visual operator; N is the total number of visual objects in $S_t$; inv( ) computes the invariance between two visual objects. If $v_{i,t+1}$ is invisible, inv( )=0.0; otherwise it is the average invariance of locations, sizes, and colors:

$$inv(v_{i,t}, v_{i,t+1}) = Avg[inv\_loc(v_{i,t}, v_{i,t+1}), inv\_size(v_{i,t}, v_{i,t+1}), inv\_color(v_{i,t}, v_{i,t+1})].$$

Similarly, we define a semantic overlap metric that assesses whether semantically related items remain together across displays. It computes the semantic relevance of $S_t$ and $S_{t+1}$:

$$O_s(S_t, S_{t+1}) = \frac{1}{N^2} \sum_i \sum_j (R_s)d_i, d_j)),$$

where data objects $d_i$ and $d_j$ are encoded by $v_{i,t}$ and $v_{j,t+1}$, respectively, $R_s( )$ computes their semantic relevance using Formula (a) above.

Using the visual and semantic overlap metrics defined above, we model an overall display overlap metric regulated by the user navigation preference, which allows more display overlap for data browsing but less overlap for data filtering:

$$o(s_t, s_{t+1}) = \epsilon[\omega_1 \times O_v + \omega_2 \times O_s], \quad (4)$$

where weights $\omega_1 = \omega_2 = 0.5$, and $\epsilon$ is a constant, $\epsilon = 1.0$ for data browsing, otherwise $\epsilon = 0.5$.

Preserving perceptual landmarks. Perceptual landmarks are distinguishable features that anchor a visual context transition, which in turn helps users to relate information in successive scenes. For example, the Westchester county map serves as a common background for displays depicted in FIGS. 2A-C and 4-6 and key geographical landmarks such as major rivers and highways persist in scenes whenever possible (e.g., Hudson river in FIGS. 2A-C). To preserve the maximal number of perceptual landmarks in a visual context, we count the normalized number of landmarks in the context:

$$L(S_{t+1}) = L_{t+1}/N, \quad (5)$$

where $L_{t+1}$ is the number of landmarks existing in visual context $S_{t+1}$, and N is the total number of landmarks existing in an entire application.

Ensuring smooth transition. Sudden changes in a scene prevents users from visually tracking the changes. As a result, the causal connection between an existing scene and a new scene may be lost. To ensure smooth transitions between successive displays, animation is often used to provide users with a powerful cue to interpret the changes. We define a metric to compute the average smoothness of applying a set of visual operators:

$$T(Op) = Avg(smoothness(op_i), \forall i], \quad (6)$$

where visual operator $op_i \in Op$, smoothness( ) is defined by operator cost (above):

$$smoothness(op_i) = 1 - cost(op_i).$$

The above metric states that the less mental cost that an operator incurs, the more smooth transition that a user perceives.

Combining formulas 4-6, we define an overall visual momentum metric to ensure the maximal across-display continuity:

$$\phi(Op, S_t, S') = Avg[O, L, T], \quad (7)$$

where visual operators Op transform visual context $S_t$ to incorporate the new scene S'.

(B)(ii) Visual Structuring Metrics

In addition to maximizing visual momentum during a visual context transition, we ensure that the structure of the context be coherent after the transition. Since our sketch generation takes care of the structuring issues regarding visual encoding (FIG. 4), here we focus on the structuring issues concerning visual integration from two aspects. One is to ensure a proper visual ordering so that users can easily attend to the new content. The other is to minimize the visual clutter after the integration of new information.

Establishing a proper visual ordering. To establish a proper visual ordering, we constrain that data items important to the current user query be expressed prominently. For example, in FIG. 8(b), the system highlights the newly requested train station information, while simplifying the house representations based on their relevance to the train stations. Here the house constraining the train stations is slightly simplified, while the others are reduced to their minimum (FIG. 8(a)-(b)). To capture such desired correlation between data importance and visual prominence, we define a visual ordering metric:

$$\varsigma(S_{t+1}) = \sum_i \sum_j 1 - |l(d_i, v_i) \times P(v_j) - l(d_j, v_j) \times P(v_i)| \quad (8)$$

Here $d_i$ and $d_j$ are data objects, and $v_i$ and $v_j$ are their corresponding encoding at turn t +1. Function l( ) is the overall importance of a data object $d_i$ and its visual encoding $v_i$ using Formulas 1-2:

$$l(d_i,v_i) = \mu_1 \times l_d(d_i) + \mu_2 \times l_v(d_i),$$

where weights $\mu_1=0.7$, $\mu_2=0.3$ to favor the semantic importance. Moreover, $P_{t+1}()$ computes the visual prominence by Formula 3.

Minimizing Visual Clutter. A visually cluttered presentation may create confusions and make the scene impossible to scan. To provide an informative but uncluttered visual context, we measure the overall complexity of a display. There are known sets of factors that affect visual complexity. One set of factors includes the quantity of objects and the variations of their properties, such as the number of different colors and shapes, appearing in a scene. Another set of the factors is concerned with the spatial layout of a scene, such as symmetry and openness. Since our layout manager maintains spatial layout constraints including symmetry (FIG. 4), here we measure visual complexity using the first set of factors:

$$\chi(S_{t+1}) = \lambda_1 \times \text{colorVariety}(S_{t+1})/N_c + \lambda_2 \times \text{areaUsage}(S_{t+1}) + \lambda_3 \times \text{shapeComplexity}(S_{t+1}).$$

Here weights $\lambda_1=\lambda_2=\lambda_3=0.33$, $N_c$ is the total number of colors allowed in one display (now $N_c=7$), and color Variety( ) obtains the total number of colors used in $S_{t+1}$.

Metric areaUsage( ) computes the normalized screen space occupied by $S_{t+1}$:

$$\text{areaUsage}(S_{t+1}) = \sum_i \text{boundingArea}(v_i),$$

where visual object $v_i \in S_{t+1}$, boundingArea( ) returns the screen space occupied by vi, in a normalized screen coordinate.

Metric shapeComplexity( ) computes the total number of distinct shapes in $S_{t+1}$ and the average complexity of all shapes (different shapes are assigned different complexity values, for example, a text is considered more complex than a simple geometric shape such as a circle):

$$\text{shapeComplexity}(S_{t+1}) = \text{shapeVariety}(S_{t+1})/N \times \text{Avg}[\text{shapeComplexity}(v_i)].$$

Here N is the total of visual objects in $S_{t+1}$, shape Variety( ) and shapeComplexity( ) are two features defined in Table 1.

To minimize the visual complexity of a scene, we maximize:

$$\Psi(S_{t+1}) = \gamma[1-\chi(S_{t+1})], \quad (9)$$

where γ is a constant, γ=0.5 for data browsing; otherwise γ=1.0.

(C) Simulated-Annealing Algorithm

Combining Formulas 7-9, we define an overall objective function:

$$\text{reward}(Op, S_t, S') = \omega_1 \times \phi + \omega_2 \times \zeta + \omega_3 \times \Psi. \quad (10)$$

Here Op is a set of visual operators for transforming visual context $S_t$ to incorporate new scene S', and weights $\omega_1=\omega_2=\omega_3=0.33$.

Our goal now is to find a set of visual operators that maximizes the objective function. This task is to solve a typical quadratic assignment problem, which is NP-hard. Since a simple greedy algorithm may suffer from being trapped at local maxima, we adopt simulated annealing, which has proven to be effective for solving this class of problems.

Table 3 below outlines an illustrative simulated-annealing algorithm:

TABLE 3

| | List simulatedAnnealing (Scene S, Scene S'). |
|---|---|
| 1 | List result ← empty |
| 2 | float T ← T0 |
| 3 | while (T> Tmin) do |
| 4 | for each sample count ϵ [1, MAX_SAMPLE_COUNT] |
| 5 | Operator op ← find_operator(S, S', result) |
| 6 | if (op == null) then return result endif |
| 7 | List currOpList ← result + op |
| 8 | float diff ← reward(currOpList) - reward(result) |
| 9 | if diff> 0 then add op to result |
| 10 | else if probability exp(-diff/T) > rand(0, 1) |
| 11 | then add op to result endif |
| 12 | endif |
| 13 | endfor |
| 14 | T ← T - Δt |
| 15 | endwhile |
| 16 | return result |

The input to the algorithm is visual context S at the beginning of user turn t+1, and a new scene S' to be integrated. The algorithm uses a "temperature" parameter T to populate the desired result list iteratively (lines 2-15). In our experiments, T is initialized to be T0=2.0, the minimal temperature Tmin=0.05 and reduction rate Δt=0.1, which together control the number of iterations.

During each iteration, the algorithm samples a set of operators (now MAX_SAMPLE_COUNT=40) (lines 4-13). In each sampling, routine find_operator( ) uses a greedy strategy to find a top candidate (line 5). Specifically, it computes a reward( ) for applying already selected operators and an operator op to a visual object that has not been updated by the same operator (Formula 10). It then ranks all candidates by their reward values and returns the top one. Using the top candidate and the existing result set, the algorithm tests whether the reward be greater than that of using the existing result set alone (lines 7-8). If it is better, the candidate is then added to the result set (line 9). Otherwise, it tests whether the current control probability is greater than a random number generated by rand( ) between [0, 1] (line 10). If it is true, the candidate is then added (line 11).

In each iteration, parameter T controls the probability of accepting sub-optimal operators. It is then gradually reduced so that the algorithm is less likely to accept sub-optimal operators (line 14). When the algorithm eventually converges (i.e., T reaches a target minimum temperature), it returns a set of visual operators that maximizes our objective function in Formula 10 (line 16). The complexity find_operator( ) is $O(n^2 \times m^2)$, where n is the total number of visual objects in $S_t$ and S', and m is the number of available operators. Since the number of steps in temperature decrease and the total number of samples evaluated at each temperature are constants, the total complexity of our algorithm is $O(n^2 \times m^2)$.

After finding a set of desired visual operators, the system groups the operators by their type and by their operands. For example, the system groups together all Highlight operators that have the same type of operands. The system then determines the order of applying these operators. Operators within a group may be applied at the same time. Such application guides users to recognize perceptual groupings during visual transition. For example, highlighting a group of houses simultaneously allows users to perceive them as a group. Moreover, operators in different groups are ordered by their temporal priority. For example, Delete normally occurs before Add to prevent the obsolete data from clobbering the new data. Now we statically define the temporal priority for each type of operator.

In one embodiment, three steps are used to set up the visual context management method. First, we define the static features such as assigning data semantic categories (Table 1). From our experience, building a simple data ontology helps to define these features. Second, we build a catalog of visual operators (Table 2). Third, we formulate feature-based metrics to model various constraints important to an application. For example, in a mobile application, we may model device-dependent visual context management constraints. We may also want to tune metrics based on the needs of the application. For example, we increase the weight for display overlap (Formula 4) in a data browsing application.

To bootstrap the process and avoid tuning fallacy, we recommend to start simple. So far we have used a simple data ontology, a set of basic visual operators, and equally weighted metrics (Formula 10) to adequately handle diverse interaction situations in two different applications. When necessary, it is easy to extend what we have. First, we can introduce new visual operators easily (e.g., adding a fisheye view operator for visual morphing). Moreover, we can easily incorporate new features/metrics in our objective function to obtain the desired functionality (e.g., a device-dependent operator cost metric).

In addition to supporting multimodal conversation systems, the inventive approach to visual context management is applicable to the broader problem of creating better visualizations. For example, it can be used in a GUI-driven interactive visualization system, where a more coherent visualization can he produced to integrate information obtained across multiple turns of user interaction.

When creating a visualization in an interactive environment, it is necessary to dynamically decide how to incrementally integrate new information into existing displays to ensure the coherence of the overall context. As explained in illustrative detail above, we present an optimization-based approach to visual context management. Given an existing visual context and the new information to be presented, our goal is to find a set of visual operators that can best update the existing visual context and incorporate the new information. To achieve this goal, we formulate a set of metrics to model various context management constraints, such as preserving visual ordering and maintaining visual momentum. Using these metrics, we define an overall objective function to assess the overall desirability of applying a set of visual operators. Finally, we use a simulated-annealing algorithm to maximize the objective function and find the desired operators.

Unlike existing approaches, which often consider a subset of our constraints in a more deterministic context, our optimization-based approach dynamically balances a comprehensive set of constraints for diverse interaction situations. It is also easily extensible, since we can easily incorporate new features/constraints. We have applied our work to two different applications, and our study shows that the system performs adequately against human designers.

Figure 9:
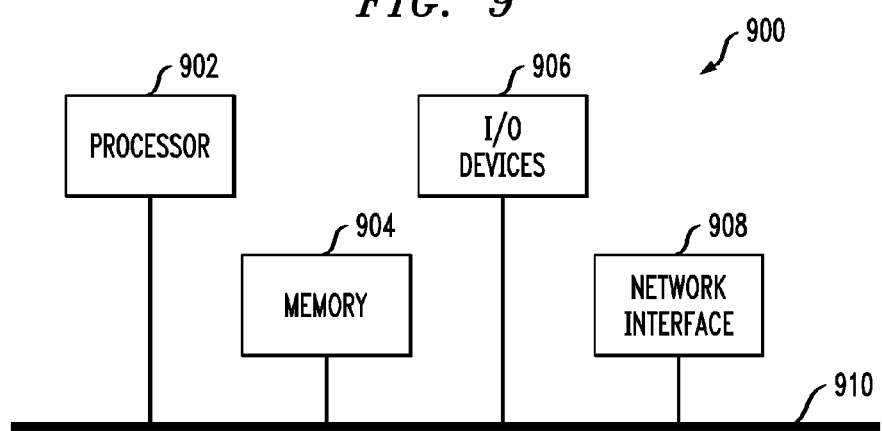
FIG. 9 is a diagram illustrating a computer system suitable for implementing an information-seeking system, according to one embodiment of the present invention.

Referring lastly to FIG. 9, a diagram illustrates a computer system suitable for implementing an information-seeking system, according to one embodiment of the present invention. For example, the illustrative architecture of FIG. 9 may be used in implementing any and all of the components and/or steps described in the context of FIGS. 1 through 8.

As shown, the computer system 900 may be implemented in accordance with a processor 902, a memory 904, I/O devices 906, and a network interface 908, coupled via a computer bus 910 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing visual context management services. By way of example, a service provider agrees (e.g., via a service level agreement or some informal agreement or arrangement) with a service customer or client to provide visual context management services. That is, by way of one example only, the service provider may host the customer's web site and associated applications. Then, in accordance with terms of the contract between the service provider and the service customer, the service provider provides visual context management services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of updating an existing visual display responsive to a subsequent user query, comprising the steps of:

obtaining new information requested by the subsequent user query; and dynamically deriving one or more visual transformations for updating at least a portion of the existing display to incorporate the new information, wherein the transformation derivation is modeled as an optimization operation which attempts to balance visual context management constraints and to achieve a desired presentation of intended information, and the optimization operation comprises computing an overall display overlap metric based on a visual overlap metric and a semantic overlap metric and regulating the overall display overlap metric to allow more overlap for a data browsing display application and less overlap for a data filtering display application;

wherein the existing display comprises search results associated with a prior user query, the new information comprises search results associated with the subsequent user query, and the intended information comprises at least a portion of the search results associated with the prior user query and at least a portion of the search results associated with the subsequent user query.

2. The method of claim 1, wherein the step of dynamically deriving visual transformations to incorporate new information into the existing display further comprises modeling the visual context management constraints as feature-based desirability metrics.

3. The method of claim 2, wherein the step of dynamically deriving visual transformations to incorporate new information into the existing display further comprises the step of one of the feature-based metrics measuring a perceptual landmark preservation value.

4. The method of claim 2, wherein the step of dynamically deriving visual transformations to incorporate new information into the existing display further comprises the step of one of the feature-based metrics measuring a transition smoothness value.

5. The method of claim 2, wherein the step of dynamically deriving visual transformations to incorporate new information into the existing display further comprises the step of one of the feature-based metrics measuring a visual ordering value.

6. The method of claim 2, wherein the step of dynamically deriving visual transformations to incorporate new information into the existing display further comprises the step of one of the feature-based metrics measuring a visual clutter value.

7. The method of claim 2, wherein the step of dynamically deriving visual transformations to incorporate new information into the existing display further comprises the step of formulating the feature-based metrics using user information.

8. The method of claim 7, wherein the step of dynamically deriving visual transformations to incorporate new information into the existing display further comprises the user information comprising a data navigation preference of the user.

9. The method of claim 2, wherein the step of dynamically deriving visual transformations to incorporate new information into the existing display further comprises the step of performing the optimization operation such that the desirability metrics are maximized for one or more visual transformation operators.

10. The method of claim 1, wherein the optimization operation comprises a global optimization technique.

11. The method of claim 10, wherein the global optimization technique comprises a simulated-annealing technique.

12. Apparatus for updating an existing visual display responsive to a subsequent user query, comprising:
a memory; and
a processor coupled to the memory and operative to: (i) obtain new information requested by the subsequent user query; and (ii) dynamically derive one or more visual transformations for updating at least a portion of the existing display to incorporate the new information, wherein the transformation derivation is modeled as an optimization operation which attempts to balance visual context management constraints and to achieve a desired presentation of intended information, and the optimization operation comprises computing an overall display overlap metric based on a visual overlap metric and a semantic overlap metric and regulating the overall display overlap metric to allow more overlap for a data browsing display application and less overlap for a data filtering display application;

wherein the existing display comprises search results associated with a prior user query, the new information comprises search results associated with the subsequent user query, and the intended information comprises at least a portion of the search results associated with the prior user query and at least a portion of the search results associated with the subsequent user query.

13. The apparatus of claim 12, wherein the operation of dynamically deriving visual transformations to incorporate new information into the existing display further comprises modeling the visual context management constraints as feature-based desirability metrics.

14. The apparatus of claim 13, wherein the operation of dynamically deriving visual transformations to incorporate new information into the existing display further comprises the step of one of the feature-based metrics measuring a perceptual landmark preservation value.

15. The apparatus of claim 13, wherein the operation of dynamically deriving visual transformations to incorporate new information into the existing display further comprises the step of one of the feature-based metrics measuring a transition smoothness value.

16. The apparatus of claim 13, wherein the operation of dynamically deriving visual transformations to incorporate new information into the existing display further comprises the step of one of the feature-based metrics measuring a visual ordering value.

17. The apparatus of claim 13, wherein the operation of dynamically deriving visual transformations to incorporate new information into the existing display further comprises the step of one of the feature-based metrics measuring a visual clutter value.

18. The apparatus of claim 13, wherein the operation of dynamically deriving visual transformations to incorporate new information into the existing display further comprises the step of formulating the feature-based metrics using user information.

19. The apparatus of claim 18, wherein the operation of dynamically deriving visual transformations to incorporate new information into the existing display further comprises the user information comprising a data navigation preference of the user.

20. The apparatus of claim 13, wherein the operation of dynamically deriving visual transformations to incorporate new information into the existing display further comprises performing the optimization operation such that the desirability metrics are maximized for one or more visual transformation operators.

21. An article of manufacture for updating an existing visual display responsive to a subsequent user query, comprising a machine readable medium containing one or more programs which when executed implement the steps of:
obtaining new information requested by the subsequent user query; and dynamically deriving one or more visual transformations for updating at least a portion of the existing display to incorporate the new information, wherein the transformation derivation is modeled as an optimization operation which attempts to balance visual context management constraints and to achieve a desired presentation of intended information, and the optimization operation comprises computing an overall display overlap metric based on a visual overlap metric and a semantic overlap metric and regulating the overall display overlap metric to allow more overlap for a data browsing display application and less overlap for a data filtering display application;

wherein the existing display comprises search results associated with a prior user query, the new information comprises search results associated with the subsequent user query; and the intended information comprises at least a portion of the search results associated with the prior user query and at least a portion of the search results associated with the subsequent user query.

22. A method of providing a service for updating an existing visual display responsive to a subsequent user query, comprising the step of:

a service provider, in response to obtained new information requested by the subsequent user query, enabling the step of dynamically deriving one or more visual transformations for updating at least a portion of the existing display to incorporate the new information, wherein the transformation derivation is modeled as an optimization operation which attempts to balance visual context management constraints and to achieve a desired presentation of intended information, and the optimization operation comprises computing an overall display overlap metric based on a visual overlap metric and a semantic overlap metric and regulating the overall display overlap metric to allow more overlap for a data browsing display application and less overlap for a data filtering display application;

wherein the existing display comprises search results associated with a prior user query, the new information comprises search results associated with the subsequent user query; and the intended information comprises at least a portion of the search results associated with the prior user query and at least a portion of the search results associated with the subsequent user query.

23. The method of claim 1, wherein balancing visual context management constraints comprises balancing at least one semantic constraint and at least one visual constraint.

24. The method of claim 2, wherein the feature-based metrics comprise at least one semantic metric and at least one visual metric.

25. The method of claim 1, wherein the regulation of the overall display metric is based on user preference.

26. The method of claim 1, wherein the visual overlap metric comprises a visual invariance metric, and wherein the semantic overlap metric comprises a semantic relevance metric.

27. The method of claim 1, wherein the optimization operation comprises computing the overall display overlap metric based on a visual invariance metric and a semantic relevance metric.

* * * * *